(12) United States Patent
Liu et al.

(10) Patent No.: US 8,286,527 B2
(45) Date of Patent: Oct. 16, 2012

(54) MANIPULATOR

(75) Inventors: Zhen-Xing Liu, Shenzhen (CN); Yong Zhang, Shenzhen (CN)

(73) Assignees: Hong Fu Jin Precision Industry (ShenZhen) Co., Ltd., Shenzhen, Guangdong Province (CN); Hon Hai Precision Industry Co. Ltd., Tu-Cheng, New Taipei (TW)

( * ) Notice: Subject to any disclaimer, the term of this patent is extended or adjusted under 35 U.S.C. 154(b) by 391 days.

(21) Appl. No.: 12/685,089

(22) Filed: Jan. 11, 2010

(65) Prior Publication Data

US 2011/0120252 A1 May 26, 2011

(30) Foreign Application Priority Data

Nov. 26, 2006 (CN) .......................... 2009 1 0310493

(51) Int. Cl.
*B25J 17/00* (2006.01)

(52) U.S. Cl. ................. 74/490.02; 74/490.05; 901/28; 901/42; 901/43

(58) Field of Classification Search ............... 74/490.01, 74/490.02, 490.03, 490.04, 490.05, 490.06, 74/490.07; 901/15, 16, 17, 27, 28, 42, 43
See application file for complete search history.

(56) References Cited

U.S. PATENT DOCUMENTS

| | | | |
|---|---|---|---|
| 5,624,364 A * | 4/1997 | Zimmer | 483/16 |
| 6,696,810 B2 * | 2/2004 | Uematsu et al. | 318/568.21 |
| 2001/0025836 A1 * | 10/2001 | Shimogama | 219/125.1 |
| 2002/0007692 A1 * | 1/2002 | Albertsson et al. | 74/490.02 |
| 2007/0158504 A1 * | 7/2007 | Burlot | 248/52 |
| 2009/0249915 A1 * | 10/2009 | Iwai et al. | 74/490.02 |

* cited by examiner

*Primary Examiner* — David M Fenstermacher
(74) *Attorney, Agent, or Firm* — Altis Law Group, Inc.

(57) ABSTRACT

An exemplary manipulator includes arms, an inlet conduit, and sealing members. The arms are rotatably joined. The inlet conduit extends into one of the arms and non-combustible gas is introduced into the arms via the inlet conduit. The sealing members are disposed where two corresponding of the arms are rotatably joined together. The manipulator is doubly protected from infiltration by unwanted gases by the high pressure gas in the manipulator and by the sealing members.

18 Claims, 4 Drawing Sheets

MANIPULATOR

BACKGROUND

1. Technical Field

The present disclosure generally relates to manipulators, and particularly to manipulators with combustion protection.

2. Description of Related Art

With developments in industrial technologies, manipulators are increasingly applied in hazardous environments such as those involving potentially explosive concentrations of combustible gas, dust, powder, etc. Manipulators can be utilized where human operators would be in too much danger.

Manipulators often have a complex construction, including electrical components as motors, relays, electromagnetic valves, electrical cables, and so on. When a manipulator operates in a hazardous environment, to prevent combustible gas, dust or other volatile material from entering the manipulator and detonating when encountering electrical activity therein, incombustible gas is introduced into the manipulator interior to prevent ingress of the unstable material.

The manipulator can be further protected by ensuring that the interior gas pressure of the manipulator exceeds the air pressure of the ambient environment. However, during operation of the manipulator, milling powder, paint vapor, or other combustible particulate matter may enter the manipulator through the joints thereof, thereby creating danger of explosion. This can occur even when the interior gas pressure exceeds the air pressure of the ambient environment. Additionally, when the manipulator is idle and remains in a hazardous environment, no incombustible gas is introduced into the manipulator, and the gas pressure inside the manipulator is the same as the air pressure outside the manipulator. Thus combustible gas, dust and other volatile materials can drift into the manipulator interior, and establish conditions in which an explosion is possible when the manipulator is powered up.

To enhance the security of a manipulator that has been idle, high pressure gas is introduced into the manipulator before it is powered up. However, such a procedure delays the operational deployment of the manipulator. In addition, the root cause of the danger, namely the combustible material entering the manipulator through the joints, is not addressed.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
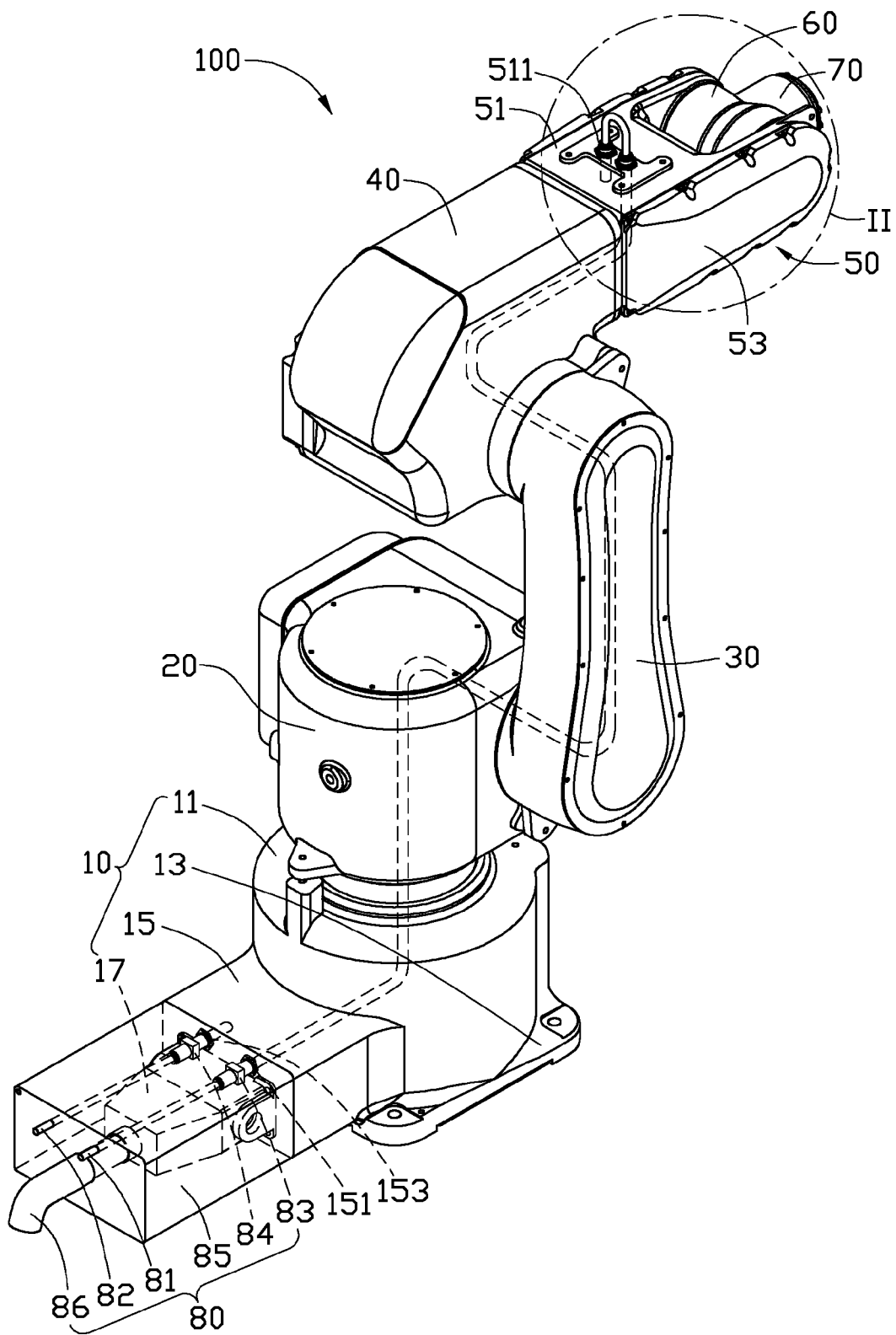
FIG. 1 is an assembled, isometric view of an embodiment of a manipulator.

Referring to FIG. 1, a manipulator 100 includes a first arm 10, a second arm 20, a third arm 30, a fourth arm 40, a fifth arm 50, a sixth arm 60, and a seventh arm 70 rotatably joined to each other in that order. The manipulator 100 further includes an air-pressure system 80 and sealing members 90. The sealing members 90 are disposed where the first arm 10 is joined with the second arm 20.

In the manipulator 100, one end of the second arm 20 is joined with the first arm 10. One end of the third arm 30 is joined with one side of the second arm 20, and the other end of the third arm 30 is joined with one side of the fourth arm 40. The fifth arm 50 is joined with one end of the fourth arm 40. Two opposite ends of the sixth arm 60 are joined with the fifth arm 50. One end of the seventh arm 70 is joined with the sixth arm 60, and the other end of the seventh arm 70 is free. That is, one end of the seventh arm 70 is the free end of the manipulator 100. In the illustrated embodiment, the axis around which the third arm 30 rotates relative to the second arm 20 is perpendicular to the axis around which the second arm 20 rotates relative to the first arm 10, and parallel to the axis around which the fourth arm 40 rotates relative to the third arm 30.

The first arm 10 includes a main body 11, a first connecting portion 13 formed at one end of the main body 11, a second connecting portion 15 formed on one side of main body 11, and a plug 17 received in the second connecting portion 15. The second connecting portion 15 defines an inlet 151 and an outlet 153. The first arm 10 is capable of being fixed to the ground or other equipment via the first connecting portion 13. In the illustrated embodiment, the first connecting portion 13 is a flange, and the second connecting portion 15 is a protrusion formed on one side of the main body 11.

Figure 2:
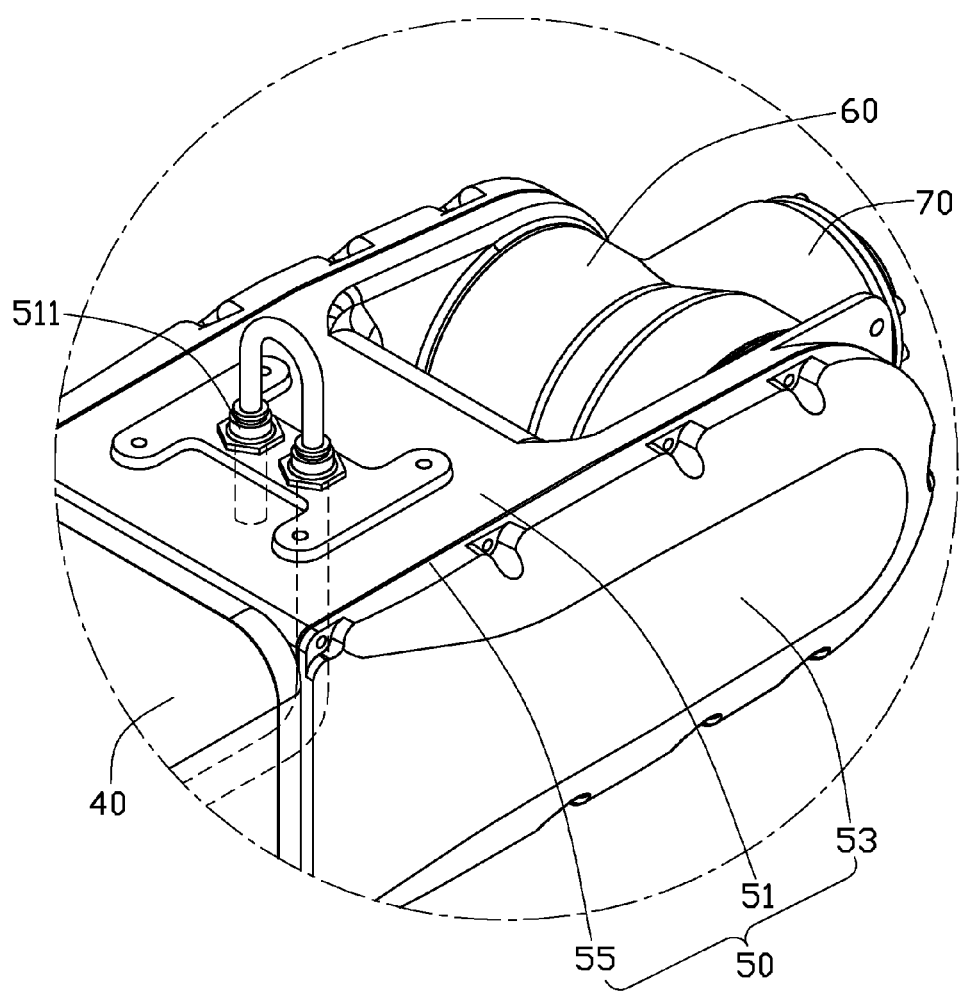
FIG. 2 is an enlarged view of a circled portion II of FIG. 1.

Referring also to FIG. 2, the fifth arm 50 includes a main casing 51, two covers 53 on two opposite sides of the main casing 51, and two gaskets 55 disposed between the covers 53 and the main casing 51, respectively. The covers 53 are on the main casing 51, creating a hermetical seal. The gaskets 55 ensure the seal is strong and reliable. The main casing 51 defines two tie-ins 511. In the illustrated embodiment, the tie-ins 511 are essentially in the form of fastened, hermetical bushings. The covers 53 are fixed to the main casing 51 by fasteners. The number of fasteners is sufficient for the covers 53 to not disengage from the main casing 51 even in the event of explosive combustion inside the casing 51. In the illustrated embodiment, there are nine fasteners. The gaskets 55 may alternatively be adhered or welded to the main casing 51. In other embodiments, there may be only one cover 53, and correspondingly only one gasket 55.

In other embodiments, any one or more of the other arms 10, 20, 30, 40, 60, and 70 may include one or more gaskets 55, in much the same way as the gaskets 55 on the fifth arm 50 are provided.

The air-pressure system 80 includes an inlet conduit 81, an outlet conduit 82, a pressure regulating member 83, a monitor 84, a protecting box 85, and a third conduit 86. The inlet conduit 81 extends in the first arm 10, the second arm 20, the third arm 30, the fourth arm 40, and the fifth arm 50 in that order, and extends out of the fifth arm 50 through one tie-in 511 of the fifth arm 50, and then extends back into the fifth arm 50 through the other tie-in 511. One end of the outlet conduit 82 extends into the first arm 10, and the other end of the outlet conduit 82 extends out of the protecting box 85. The pressure regulating member 83 is disposed on the inlet conduit 81, and the monitor 84 is disposed on the outlet conduit 82. The protecting box 85 is fixed on the second connecting portion 15 of the first arm 10, and receives the plug 17, the pressure regulating member 83, and the monitor 84 therein. The third conduit 86 is flexible material, with one end thereof fixed on a periphery of the protecting box 85 to receive cables connected to the plug 17 of the first arm 10.

Figure 3:
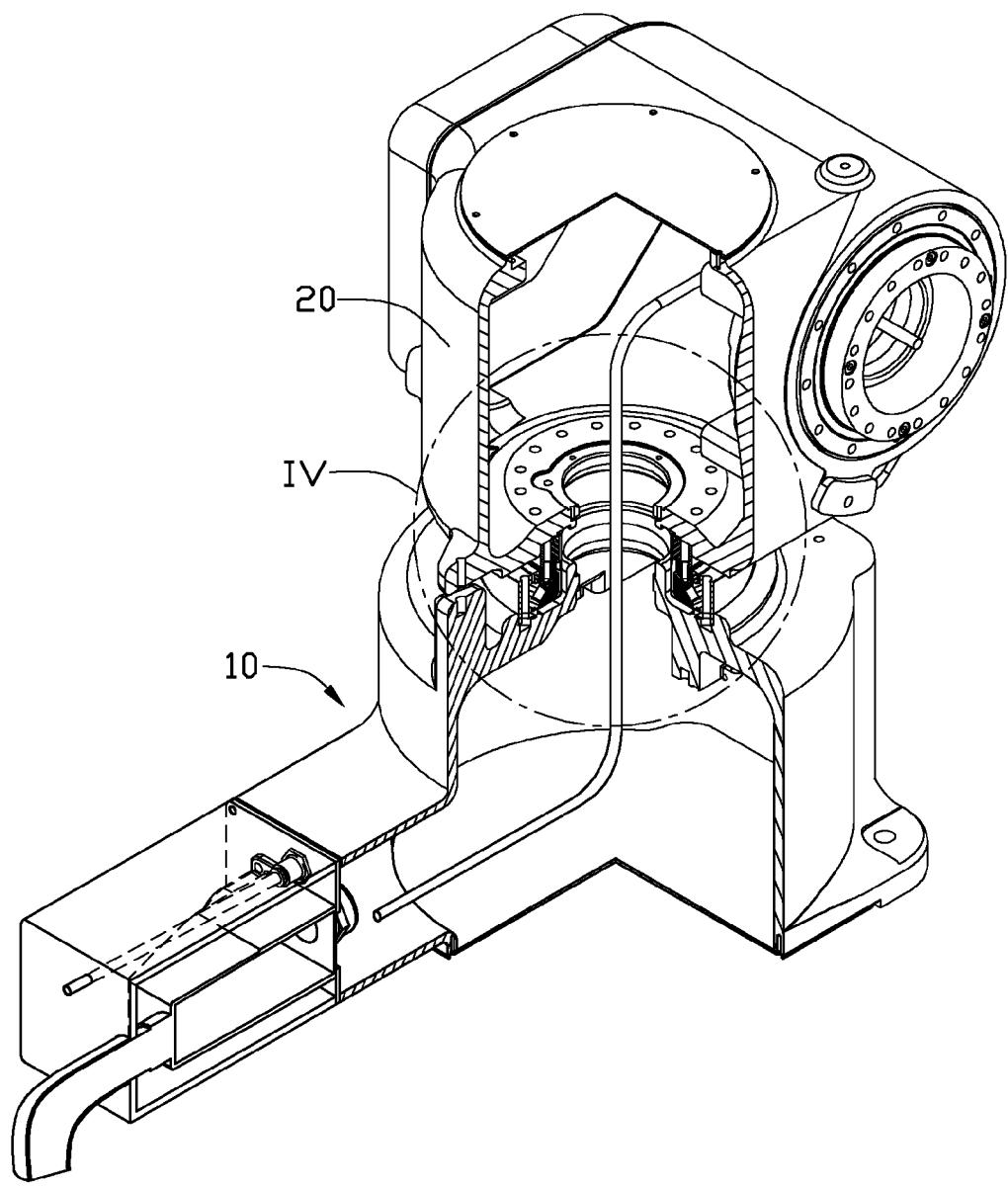
FIG. 3 is a cutaway view of some components of the manipulator of FIG. 1.
Figure 4:
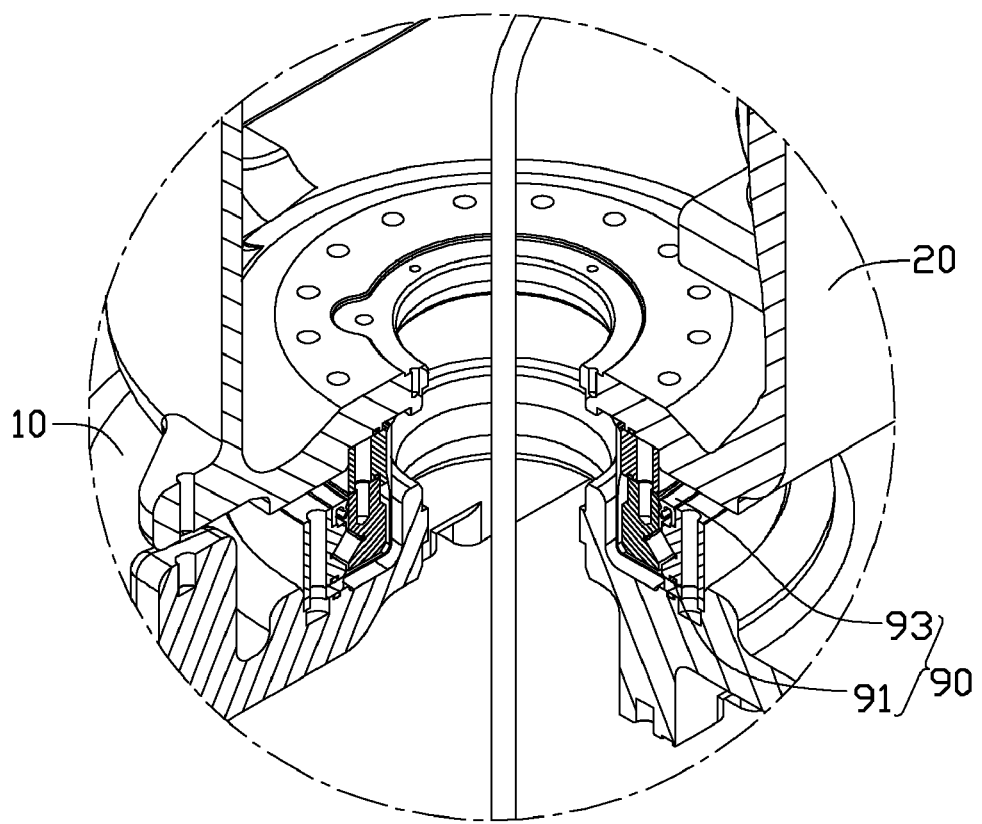
FIG. 4 is an enlarged view of a circled portion IV of FIG. 3.

Referring to FIG. 1, FIG. 3 and FIG. 4, a plurality of sealing members 90 are provided where the first arm 10 joins the second arm 20. The sealing members 90 include at least one obturating ring 91 and at least one oil ring 93. If the first arm 10 and the second arm 20 are joined without utilizing any sealing means, typically, many gaps are formed at the joint therebetween. Some of the gaps communicate the interior of the arms 10, 20 with the exterior of the arms 10, 20. The sealing members 90 inlayed in these gaps isolate the interior of the arms 10, 20 from the exterior of the arms 10, 20. In the illustrated embodiment, there are four obturating rings 91, and there is only one oil ring 93. In other embodiments, there may be one, two, three, or more than four obturating rings 91, and there may be more than one oil ring 93. That is, the number and type of sealing members 90 depends on the number of gaps that are anticipated to exist at the joint between the first and second arms 10, 20 in the case that no sealing means were utilized. In further or other embodiments, the sealing members 90 may include gaskets, or other suitable sealing members.

In the manipulator 100, the sealing members 90 may be inlayed in any of the joints between any two of the arms 10, 20, 30, 40, 50, 60, and 70.

Referring to FIG. 1, in the manipulator 100, a shell of each arm 10, 20, 30, 40, 50, 60, and 70 is cast with a predetermined thickness. Such that the shells have a predetermined mechanical strength sufficient to withstand and explosive combustion event in the interior of the manipulator 100, and the shell remains intact and the explosion is contained.

In use of the manipulator 100, non-combustible gas is introduced into the fifth arm 50 of the manipulator 100 through the inlet conduit 81, thereby elevating the gas pressure within. The non-combustible gas is, for example, inert gas, carbon dioxide, or another suitable gas. After being introduced into the fifth arm 50, the non-combustible gas diffuses into the first arm 10 via the fourth arm 40, the third arm 30, and the second arm 20, and diffuses into the seventh arm 70 via the sixth arm 60, and finally suffuses all the arms 10, 20, 30, 40, 50, 60, and 70 of the manipulator 100. This is achieved by the high pressure gas introduced into the manipulator 100 via the fifth arm 50 generating gas pressure in the fifth arm 50 which is higher than the gas or air pressure in the other arms 10, 20, 30, 40, 60, and 70 of the manipulator 100. Furthermore, since the first arm 10 is far away from the fifth arm 50, the gas or air pressure in the first arm 10 is lower than that of any of the other arms 20, 30, 40, 50, 60, and 70 of the manipulator 100.

The high pressure gas is capable of escaping from the manipulator 100 interior through the outlet conduit 82. When the high pressure gas is introduced into the manipulator 100, the pressure regulating member 83 regulates the velocity of the high pressure gas, such that the gas pressure in the manipulator 100 is controlled. When the high pressure gas diffuses out of the manipulator 100, the monitor 84 monitors the pressure of the high pressure gas escaping through the outlet conduit 82, so that any abnormal status of the gas pressure may be detected in real time.

Since the gas pressure in the manipulator 100 is higher than the air pressure of the exterior, combustible gas, dust and other volatile matter is prevented from entering the manipulator 100. The sealing members 90 (such as those shown in FIG. 4) inlayed in the joints between two corresponding joined arms 10, 20, 30, 40, 50, 60, and 70 further ensure isolation of the interior of manipulator 100. Thereby, even when the manipulator 100 is idle, combustible gas, dust and other volatile matter is apt to not enter the manipulator 100. Thus, the danger of combustion or explosion inside the manipulator 100 when the manipulator 100 is next powered up is minimized or even eliminated altogether.

In addition, cleaning of the interior of the manipulator 100 prior to restarting the manipulator 100 is not required, thereby enhancing operational efficiency.

In the manipulator 100, the fifth arm 50 defines the tie-ins 511. Thus when the manipulator 100 is operated in an environment with no combustible gas or air or combustible powder, the inlet conduit 81 in the manipulator 100 can be refitted. For example, the inlet conduit 81 can extend out of the fifth arm 50 through one tie-in 511 and connect to other controlling equipment. Another conduit can be added to the manipulator 100, with two ends of the other conduit respectively connected to the other tie-in 511 of the fifth arm 50 and the outlet conduit 82. Thus, the inlet conduit 81 is easily refitted.

The protecting box 85 on the second connecting portion 15 of the first arm 10 and the third conduit 86 receive cables connected with the plug 17 inside the first arm 10. This allows the cables to be isolated from the ambient environment, and accordingly combustible gas, dust and other volatile matter cannot enter the manipulator 100 via the cables.

Since the fifth arm 50 is adjacent to the seventh arm 70 and frequently rotates, the fifth arm 50 has a greater need for protection from explosive combustion. Application of the high pressure gas into the fifth arm 50 and diffusion of the gas from the fifth arm 50 to the other arms 10, 20, 30, 40, 60, and 70 provides the needed enhanced protection. Since the gas pressure in the first arm 10 is lower than that of other portions in the manipulator 100, and since the monitor 84 is disposed adjacent to the first arm 10, the gas pressure in the whole manipulator 100 achieves the needed pressure requirement as long as the pressure detected by the monitor 84 is normal.

In alternative embodiments, the outlet 153 and the outlet conduit 84 can be omitted. In such case, once sufficient non-combustible gas is introduced into the manipulator 100, the inlet conduit 81 is closed, and a monitor monitors the gas pressure in the manipulator 100. The fifth arm 50 need not necessarily define the tie-ins 511. Instead, the distal end of the inlet conduit 81 fixed in the fifth arm 50. Moreover, the distal end of the inlet conduit 81 may be fixed in the sixth arm 60 or the seventh arm 70. The second connecting portion 15 of the first arm 10 need not necessarily define the inlet 151. Instead, one of the other arms 20, 30, 40, 50, 60, and 70 in which the distal end of the inlet conduit 81 is fixed may define an inlet, and the inlet conduit 81 can be inserted into the manipulator 100 through such inlet.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A manipulator, comprising:
a plurality of arms rotatably joined together;
an inlet conduit provided at an exterior of at least one of the arms, the inlet conduit communicating with the interior of the at least one of the arms; and
at least one sealing member disposed where two corresponding of the plurality of arms are rotatably joined together;
wherein the inlet conduit extends into at least one of the arms, and is capable of introducing high pressure non-combustible gas into the manipulator to prevent external volatile matter from entering into the manipulator.

2. The manipulator of claim 1, further comprising an inlet, an outlet, and an outlet conduit, wherein the inlet conduit extends through the inlet, and the outlet conduit extends through the outlet.

3. The manipulator of claim 2, further comprising a protecting box and a monitor, wherein the protecting box covers the inlet and the outlet, the monitor is received in the protecting box, and the inlet conduit and the outlet conduit are partially received in the protecting box.

4. The manipulator of claim 3, further comprising a plug and a third conduit, wherein the plug is received in the protecting box, and the third conduit is fixed on the periphery of the protecting box and communicates with the interior of the protecting box.

5. The manipulator of claim 1, further comprising two tie-ins, wherein the inlet conduit extends out of the manipulator through one of the tie-ins and further extends back into the manipulator through the other tie-in.

6. The manipulator of claim 5, wherein one of the plurality of arms has a free end, another one of the plurality of arms adjacent to the arm having the free end defines the tie-ins, and another one of the arms away from the arm having the free end defines the outlet.

7. The manipulator of claim 1, wherein a shell of each of the plurality of arms is cast with a predetermined thickness to enable it has a predetermined mechanical strength sufficient to withstand an explosive combustion event in the interior of the manipulator.

8. The manipulator of claim 1, wherein at least one of the arms comprises a main casing, at least one cover, and at least one gasket, and the at least one cover and the at least one gasket cover the main casing and cooperatively form a hermetical seal of the main casing.

9. A manipulator, comprising:
  a plurality of arms rotatably joined one to the other in sequence;
  an air-pressure system configured for introducing high pressure gas into the manipulator and comprising an inlet conduit communicating with the interior of at least one of the arms; and
  at least one seal member disposed where two corresponding of the plurality of the arms are rotatably joined together;
  wherein the high pressure gas fills the manipulator to prevent external volatile matter from entering into the manipulator and the at least one sealing member seals the manipulator.

10. The manipulator of claim 9, further comprising an outlet conduit, with one of the arms defining an inlet and an outlet, the inlet conduit extending into the manipulator through the inlet, and the outlet conduit extending out of the manipulator through the outlet.

11. The manipulator of claim 10, further comprising a protecting box which covers the inlet and the outlet, wherein the inlet conduit and the outlet conduit are partially received in the protecting box.

12. The manipulator of claim 10, further comprising a monitor fixed on the outlet conduit and received in the protecting box.

13. The manipulator of claim 11, further comprising a third conduit and a plug, wherein the third conduit is fixed on a periphery of the protecting box and communicates with the interior of the protecting box, and the plug is received in the protecting box.

14. The manipulator of claim 9, further comprising two tie-ins, wherein the inlet conduit extends out of the manipulator through one of the tie-in and further extends into back the manipulator through the other tie-in.

15. The manipulator of claim 14, wherein one of the plurality of arms has a free end, another one of the plurality of arms adjacent to the arm having the free end defines the tie-ins, and another one of the arms away from the arm having the free end defines the outlet.

16. The manipulator of claim 9, wherein at least one arm comprises a main casing, at least one cover, and at least one gasket, and the at least one cover and the at least one gasket are covered with the main casing and cooperatively form a hermetical seal of the main casing.

17. The manipulator of claim 9, wherein a shell of each of the plurality of arms is cast with a predetermined thickness to enable it has a predetermined mechanical strength sufficient to withstand an explosive combustion event in the interior of the manipulator.

18. The manipulator of claim 9, further comprising a pressure regulating member fixed on the inlet conduit.

* * * * *